S. J. NORDSTROM.

LUBRICATED HYDRAULIC PLUG VALVE.

APPLICATION FILED JUNE 1, 1918.

Reissued Aug. 27, 1918. 14,516.

Inventor
Sven Johan Nordstrom

By C. H. Wy Agramonte
Attorney

UNITED STATES PATENT OFFICE.

SVEN JOHAN NORDSTROM, OF MEXICO, MEXICO.

LUBRICATED HYDRAULIC PLUG-VALVE.

14,516. Specification of Reissued Letters Patent. Reissued Aug. 27, 1918.

Original No. 1,180,312, dated April 25, 1916, Serial No. 59,294, filed November 2, 1915. Application for reissue filed June 1, 1918. Serial No. 237,832.

*To all whom it may concern:*

Be it known that I, SVEN JOHAN NORDSTROM, engineer, a subject of the King of Sweden, residing at Mexico, Federal District, Mexico, have invented certain new and useful Improvements in Lubricated Hydraulic Plug-Valves, of which the following is a specification.

My invention refers to a cock or plug valve particularly adapted for pipe lines containing or conveying corrosive liquids which in ordinary cocks tend to rust the plug fast to the valve body, making the operation of the plug very difficult.

The object of the invention is to construct a cock in which the plug shall always be lubricated and if necessary can be raised, from its conical seat to break any possible rust connection, by forcing a lubricant under its lower extremity.

Another object is to provide the aforesaid plug at its lower and smaller end with a central and adjustable support to prevent the pressure of the packing from causing too much friction between the plug and the valve chamber.

Figure 1:
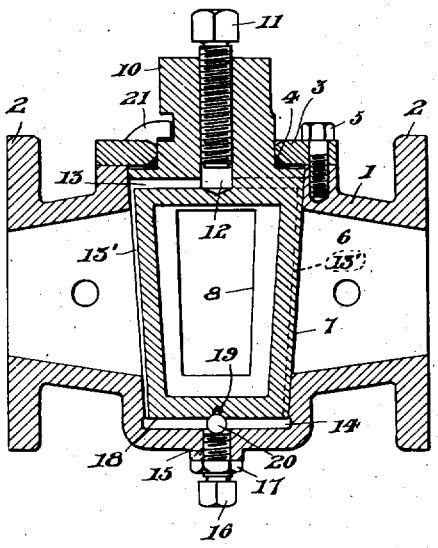

In the accompanying drawing: Figure 1 is a vertical longitudinal section and Fig. 2 is a horizontal section of the same.

Referring to the drawing (1) indicates the valve body provided with flanges (2) by which it may be connected to the tubing. In the upper part of the valve body a ring (3) is mounted to retain the packing (4) around the shank of the plug, the ring being held in place by means of screws (5). Within the valve chamber (6) is mounted a conical plug (7) provided with diametrical passages (8) and (9) which allow liquid to pass when the plug is turned to open position. Aforesaid plug is at its upper large end prolonged into a cylindrical shank to form the packing seat, and above the packing is of a square or other convenient cross section (10) for the application of a wrench or handle by which the cock is operated. This prolongation of the plug is perforated and threaded for the insertion of a screw (11). Said perforation (12) constitutes a lubricant receiving pocket or chamber and communicates with radial channels (13) which at their outer ends communicate with channels (13′) in the wall of the plug and which in their turn communicate with the space (14) between the bottom of the plug and the valve chamber. Into said space (14) may be forced a lubricant through the channels (13) from perforation (12) by turning the screw (11) into said perforation.

Figure 2:
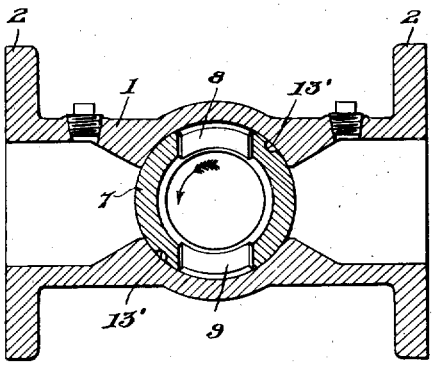

As may be seen in Fig. 2 the movement of the plug for opening the valve from the closed position which it has in Fig. 2 is 90° toward the left, owing to the stop (21) in which case the ports (8) and (9) will be placed in alinement with the tubing, letting the liquid pass.

The channels (13′) are placed with offset of 45° from the center line of the ports (8) and (9) and will therefore sweep and lubricate the walls of the valve chamber (6) without ever coming in contact with the liquid.

In Fig. 1, with the object of better illustrating the construction, one of the channels (13′) is shown turned to a position which it will never take in actual practice.

The bottom of the valve body (1) is provided with a threaded perforation (15) into which is inserted a screw (16) with its lock-nut (17) to hold it in its adjusted position. The bottom (18) of the plug (7) has a central incision (19) in which rests an anti-friction ball (20) turning freely on the flat end of screw (16). The object of this central support is to counteract the pressure of the packing which tends to force the plug (7) into valve chamber (6) and would produce great friction due to the conical form of the seat. The operation of the valve is as follows: Supposing the valve to be found stuck, that is, the plug (7) rusted fast to its seat (6) due to the action of the corrosive liquid, it can be broken loose and made to turn freely by tightening the screw (11) whose effect is to force a quantity of lubricant through the channels (13′) into the space (14) increasing the volume of lubricant in said space thereby lifting the plug from its seat, and admitting a quantity of lubricant to enter on the conical surface to be spread all over same, by turning the plug.

The central adjustable support is made to operate in the following way: The screw (16) is loosened, allowing the plug to drop within the valve chamber by its own weight and by the pressure exercised by the packing, establishing by this means an excessive friction between the plug and the chamber surface owing to the conical form of the seat; the screw (16) will then be screwed in, lifting the plug a trifle to conveniently reduce the friction, and as soon as this position is attained, the locknut (17) will be tightened so as to permanently secure this position, which will not be changed until, on account of wear the plug may have sunk too deep into the valve seat. Any other mechanical disposition for obtaining the aforesaid functions of the support, naturally may replace the support here described as for example, by replacing the anti-friction ball by any other loose member to accommodate any possible eccentricity of the supporting screw (16) in relation to the plug (7), or by making the plug (7) without incision (19) and letting it rest directly on the end of screw (16). The valve body may have any convenient form and may be provided with flanges, as has been illustrated, or with threads so that it may be connected to the pipe line.

Instead of placing the channels (13′) in plug (7) they can be made in chamber (6) of the valve body (1). The screw (11) can also be placed in valve body (1) forcing the lubricant directly into chamber (14) or into the channels (13′) and equally other modifications may be made in the construction without departing from the spirit of the invention.

Having thus described my invention, what I claim is the following:

1. In a plug valve, a valve casing having a seat and provided at the lower end of said seat with a lubricant chamber, a plug mounted in said seat and extending into said lubricant chamber, radial channels formed in the upper end of said plug and extending downward exteriorly of the plug into communication with said lubricant chamber, the upper end of the plug having a vertical bore constituting a lubricant receiving pocket communicating with the radial channels, the lubricant chamber and lubricant receiving pocket being in communication through the channels at all times, and a screw in said bore acting as a closure and as a lubricant compressor.

2. In a plug valve, a valve casing having a tapering seat, and provided at the lower end of said seat with a lubricant chamber, a tapering plug mounted in said seat with its lower end extending into said chamber, said plug at its upper end having a perforated shank projecting through the casing and provided in said upper end with channels communicating exteriorly of the plug with said chamber, an adjustable supporting bearing for the lower end of said plug, and a closure in the perforation of said shank forming a lubricant compressor.

3. In a plug valve, a valve casing having a tapered seat and provided with a lubricant chamber at the lower end of said seat, a tapered plug fitted in said seat and having its lower end received in said lubricant chamber, an adjustable supporting bearing for the lower end of said plug maintaining a space between the bottom of the plug and the base of the lubricant chamber, radial channels at the upper end of said plug in communication exteriorly of the plug with the lubricant chamber, and lubricant compressing means associated with said channels.

4. In a plug valve, a valve casing having a seat provided with a lubricant chamber, a plug fitting said seat with one end extending into the lubricant chamber, a lubricant receiving pocket in one end of the plug, a radial channel leading from the lubricant receiving pocket to the exterior of the plug, a channel in the exterior face of the plug communicating with the radial channel and the lubricant chamber, said channels establishing constant communication between the lubricant receiving pocket and the lubricant chamber.

5. In a plug valve, a valve casing having a tapering seat and provided at the smaller end of said seat with a lubricant chamber, a tapering plug mounted in said seat with its smaller end extending into said chamber and lubricant compressing means communicating with said lubricant chamber, said compressing means serving to compress the lubricant and cause the latter to exert pressure in the lubricant chamber against the end of the plug to force same from its seat.

6. In a plug valve, a valve casing having a tapering seat and provided at the smaller end of said seat with a lubricant chamber, a tapering plug mounted in said seat with its smaller end extending into said chamber, lubricant compressing means communicating with said lubricant chamber, lubricant channels in the seating surface communicating with the lubricant chamber, and means preventing the turning of the plug into position to expose the lubricant channels to liquid in the valve.

7. In a plug valve, a valve casing having a tapering seat and provided at the smaller end of said seat with a lubricant chamber, a plug mounted in said seat with its smaller end extending into said chamber, a radial channel formed in one end of said plug, and a channel in the seating surface communicating with the lubricant chamber, a lubricant receiving pocket in the plug in open communication at all times with the radial channels, the channels in the seating surface and the lubricant chamber, and lubricant compressing means in the lubricant receiving pocket.

In testimony whereof, I affix my signature in the presence of two witnesses.

SVEN JOHAN NORDSTROM.

Witnesses:
EDWARD HOEFLICH, Jr.,
EDWARDO DEL VALLE.